UNITED STATES PATENT OFFICE.

FREDERICK J. KALDENBERG, OF NEW YORK, N. Y.

MANUFACTURE OF ARTICLES FROM WASTE AMBER.

SPECIFICATION forming part of Letters Patent No. 290,888, dated December 25, 1883.

Application filed June 1, 1883. (No specimens.)

*To all whom it may concern:*

Be it known that I, FREDERICK J. KALDENBERG, a citizen of the United States, residing at New York, in the county and State of New York, have invented certain new and useful Improvements in the Manufacture of Articles from Waste Amber, of which the following is a specification.

My invention has relation to the method or process of producing articles designed for ornament or use—such as sleeve-buttons, mouth-pieces for pipes, &c.—out of the chippings or cuttings of amber, which necessarily accumulate during the process of chiseling an article out of a solid block, and which are ordinarily termed "waste amber." The process of such manufacture is fully set forth in Letters Patent granted to Abbott R. Davis, November 23, 1880, and February 8, 1881.

The object of my invention is to facilitate the process of such manufacture and produce an article having a greater uniformity of structure, greater tenacity, and a more perfect and natural color. These objects I attain by combining with the amber, before molding, a specific gum suitably prepared, and then submitting the mass so united to the action of heat and pressure in a proper mold.

In carrying out my improvement, I first select from the waste fragments of amber a number of pieces of about uniform size and color and place them in a mold. I then take a quantity of a gum known in the trade as "gum animé," and, having reduced it to a pulverized or granulated condition, I combine it with the amber, distributing the pulverized mass uniformly among the pieces of amber and in a greater or less quantity, according to the nature of the article it is desired to produce. The mold, with its contained mass, is then subjected to a heavy pressure under a moderate heat.

In the manufacture of mouth-pieces or tips for pipes and cigars, to which my present invention is more especially applicable, it is necessary, in order to produce a mouth-piece capable of sustaining the process of boring, that the pieces of amber should be perfectly welded together during the molding operation. The result of an imperfect union is to render the article valueless.

By combining with the amber the gum above mentioned in the manner described the welding operation is facilitated, and the article, when finished, is found to possess greater tenacity and is less susceptible to atmospheric changes, besides being of a clearer and more natural color.

In practice I have found it better to submit the gum to the action of heat until it becomes plastic, then allow it to harden under pressure, and then pulverize it. This operation of heating and hardening may be repeated two or three times in some cases with good effect on the gum, which acquires during such process a greater consistency, and when molded with the amber produces a better article.

Mouth-pieces or tips for pipes presenting a novel effect by a blending or mingling of colors or by blotches more or less transparent can be produced by selecting pieces of amber of different hues and arranging them in the mold with the pulverized gum, which will give the effect of milk blotches in a transparent ground after the mass has become homogeneous. Pieces of gum and pieces of amber may also be molded together.

What I claim as my invention, and desire to secure by Letters Patent, is—

1. As an improvement in the art or process of making articles from waste amber, combining with the fragments of amber pulverized or granulated gum animé and molding the same together, substantially as set forth.

2. The process of making articles from amber and gum animé, which consists in pulverizing or granulating the gum, combining it in the mold with pieces of amber or granulated amber, and then subjecting it to heat and pressure, substantially as set forth.

3. As a new article of manufacture, a mouth-piece for pipes made from fragments of amber and gum animé molded together, as described.

4. As a new manufacture, articles made of pieces of amber and granulated gum animé molded together by heat and pressure, substantially as set forth.

F. J. KALDENBERG.

Witnesses:
G. FUREK,
GEO. MERRICK.